(12) United States Patent
Sadka

(10) Patent No.: US 9,690,987 B2
(45) Date of Patent: Jun. 27, 2017

(54) SYSTEM AND METHODS FOR DETERMINATION OF POTENTIAL SOLAR INSTALLABLE SURFACE AREA

(71) Applicant: Solview Systems Ltd., Ramat Gan (IL)

(72) Inventor: Ofer Sadka, Ramat Gan (IL)

(73) Assignee: Solview Systems Ltd., Ramat Gan (IL)

( * ) Notice: Subject to any disclaimer, the term of this patent is extended or adjusted under 35 U.S.C. 154(b) by 34 days.

(21) Appl. No.: 14/626,300

(22) Filed: Feb. 19, 2015

(65) Prior Publication Data

US 2015/0161442 A1   Jun. 11, 2015

Related U.S. Application Data

(63) Continuation of application No. PCT/IL2013/050715, filed on Aug. 25, 2013.

(60) Provisional application No. 61/693,787, filed on Aug. 28, 2012.

(51) Int. Cl.
| | |
|---|---|
| *G06K 9/00* | (2006.01) |
| *G06Q 10/04* | (2012.01) |
| *G06Q 50/06* | (2012.01) |
| *G01C 11/04* | (2006.01) |
| *G06K 9/46* | (2006.01) |
| *E04D 13/18* | (2014.01) |

(52) U.S. Cl.
CPC .......... *G06K 9/00476* (2013.01); *G01C 11/04* (2013.01); *G06K 9/468* (2013.01); *G06Q 10/043* (2013.01); *G06Q 50/06* (2013.01); *F24J 2200/04* (2013.01); *Y02B 10/20* (2013.01)

(58) Field of Classification Search
CPC .................................. G06K 9/00; G01C 1/00

USPC ........ 382/113; 126/561, 569, 621, 622, 623, 126/681, 714; 73/170.27
See application file for complete search history.

(56) References Cited

U.S. PATENT DOCUMENTS

| | | | |
|---|---|---|---|
| 4,235,222 A | * | 11/1980 | Ionescu ...................... F24J 2/08 126/579 |
| 7,305,983 B1 | | 12/2007 | Meder et al. |
| 7,500,391 B2 | | 3/2009 | Woro |

(Continued)

FOREIGN PATENT DOCUMENTS

| | | |
|---|---|---|
| CN | 101918767 A | 12/2010 |
| EP | 2202483 A1 | 6/2010 |
| WO | 2007127864 A2 | 11/2007 |

OTHER PUBLICATIONS

Patent Cooperation Treaty International Search Report for PCT/IL2013/050715, Dec. 24, 2014, Israel Patent Office, Jerusalem, Israel.

(Continued)

*Primary Examiner* — Abolfazl Tabatabai
(74) *Attorney, Agent, or Firm* — M&B IP Analysts, LLC

(57) ABSTRACT

An apparatus and method for determining a potential surface for installation of solar panels are provided. The method includes extracting, from a database of overhead images, at least one overhead image respective of a location; identifying a surface outline of at least one surface within the at least one overhead image; determining a pattern associated with the surface outline, the pattern comprising at least a facet; determining a potential installation area for solar panels based on the at least facet; and, displaying the potential installation area overlaid on the overhead image.

21 Claims, 5 Drawing Sheets

(56) References Cited

U.S. PATENT DOCUMENTS

| | | | |
|---|---|---|---|
| 7,516,557 B2* | 4/2009 | Courter | G01W 1/12 |
| | | | 33/1 DD |
| 7,832,267 B2* | 11/2010 | Woro | G06F 17/5004 |
| | | | 126/621 |
| 8,078,436 B2 | 12/2011 | Pershing et al. | |
| 8,170,840 B2* | 5/2012 | Pershing | G06F 17/5004 |
| | | | 703/1 |
| 8,417,061 B2 | 4/2013 | Kennedy et al. | |
| 8,437,554 B2 | 5/2013 | Kim et al. | |
| 2006/0137736 A1 | 6/2006 | Nishitani et al. | |
| 2008/0105045 A1 | 5/2008 | Woro | |
| 2009/0234692 A1 | 9/2009 | Powell et al. | |
| 2009/0304227 A1 | 12/2009 | Kennedy et al. | |
| 2011/0205245 A1 | 8/2011 | Kennedy et al. | |
| 2012/0121125 A1 | 5/2012 | Dimov | |
| 2012/0159596 A1 | 6/2012 | Vandevelde et al. | |
| 2012/0193512 A1 | 8/2012 | Wu et al. | |
| 2012/0222500 A1 | 9/2012 | Riess et al. | |
| 2013/0146123 A1 | 6/2013 | Park | |
| 2013/0148100 A1 | 6/2013 | Magnussen et al. | |
| 2013/0152998 A1 | 6/2013 | Herzig et al. | |
| 2013/0166266 A1 | 6/2013 | Herzig et al. | |

OTHER PUBLICATIONS

First Office Action from the State Intellectual Property of the P.R.C. for Patent Application 201380053897.8, Issue Document No. 2016061601895100, Issue Date: Jun. 21, 2016.

* cited by examiner

SYSTEM AND METHODS FOR DETERMINATION OF POTENTIAL SOLAR INSTALLABLE SURFACE AREA

CROSS REFERENCE TO RELATED APPLICATIONS

This application is a continuation of International Patent Application No. PCT/IL2013/050715 filed on Aug. 25, 2013, which claims the benefit of U.S. Provisional Patent Application No. 61/693,787 filed on Aug. 28, 2012. The contents of the above-referenced documents are hereby incorporated by reference.

TECHNICAL FIELD

The present disclosure relates generally to systems and methods for identifying locations which are appropriate for installation of solar panels, and more specifically to systems and methods for determining the solar panel-installable surface area of a structure.

BACKGROUND

Energy demands are increasing worldwide and sources of energy are becoming more and more difficult to obtain and require enhanced technology for recovering. As a result, sources of energy are becoming scarcer and, therefore, are requiring increasingly complex technology to recover. In addition to conventional sources of energy, other alternative generation systems are available. These include hydroelectric, thermal and mechanical transfers of energy, wind power, and solar. In order to meet the increasing world energy demand, an increased use of solar energy is inevitable.

The effectiveness of solar systems for electricity generation or heating of water therefore depends upon the particular site in which solar energy generation is utilized. Visual assessments and manual estimates provide some indication as to the efficiency and effectiveness of a site for solar energy generation, but tend to be inefficient and can frequently be inaccurate.

Prior art methods for evaluating a structure's potential for placement of solar panels for generation of power are presently labor-intensive. A typical house evaluation includes the use of various instruments and climbing to the intended surface to profile the solar power potential by estimating the power (often in KW-hours) that may be generated. This evaluation may also take into account the effects of shade caused by other structures and objects. Based on the estimated power generation and any potential shade, the expected return on investment is assessed. If the structure has the necessary geometric specifications and reasonable annual solar exposure, then a certain solar power system size is recommended that generates a desired return-on-investment (ROI). Nonetheless, the process is time-consuming and relatively expensive.

It is noted that digital solutions for profiling a structure's potential for placement of solar panels are discussed in the related art. One solution is discussed, for example, in U.S. Pat. No. 8,417,061 entitled "Method and Systems for Provisioning Energy Systems." However, such prior art solutions typically require manual operation, which is costly and cannot provide instant and global coverage. Moreover, such prior art solutions are more susceptible to human error, thereby leading to loss of power due to inefficient placement of solar panels.

Another prior art solution, described in U.S. Pat. No. 7,500,391 entitled "System and Method for Identifying the Solar Potential of Rooftops," describes an automatic system for determining whether a certain rooftop meets certain solar-potential criteria. However, the embodiments described therein rely upon three dimensional mapping data as an input. Such three dimensional mapping data is highly expensive to generate and to maintain. Additionally, such three dimensional mapping data requires increased computing resources to store and to process, thereby reducing efficiency of systems implementing the three dimensional mapping data.

It would be therefore advantageous to provide a solution that would overcome the limitations of the prior art by automatically and cost effectively determining a potential solar power-installable surface area.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
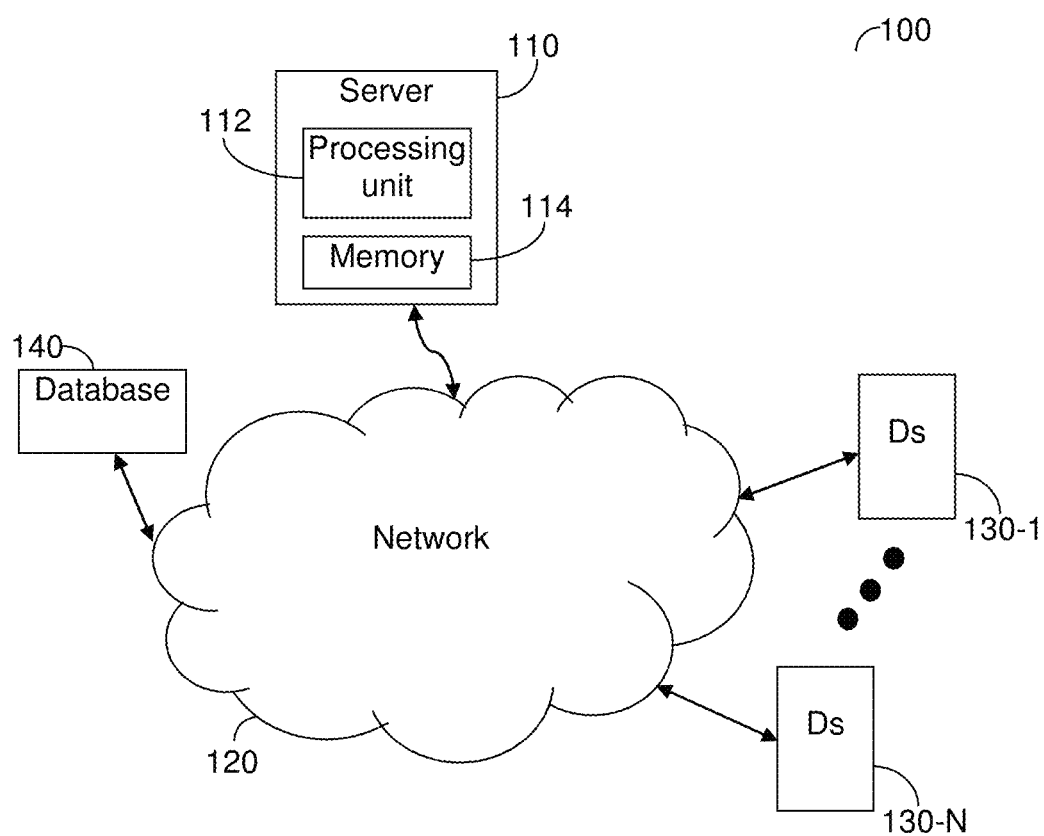
FIG. 1 is a schematic diagram of a system used to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some exemplary embodiments include system and methods for determining a potential surface for installation of solar panels. A location is received and an overhead image of the location is extracted. A surface outline of a surface, e.g., a rooftop within the location is identified. A pattern associated with the outlined surface as well as a potential installation area of solar panels are determined based on the outlined area. The system further fuses this information with other types of information, including sun path and economic incentives to determine the productivity and economic viability of the proposed solar system. In one embodiment, the potential installation area is displayed as an overlay on the overhead image of the location.

FIG. 1 depicts an exemplary and non-limiting schematic block diagram of a system 100 utilized to describe the various disclosed embodiments of for assessing an effective solar surface. A server 110 is connected to a network 120. The network 120 may be wireless, cellular or wired, a local area network (LAN), a wide area network (WAN), a metro area network (MAN), the Internet, the worldwide web (WWW), like networks, and any combinations thereof. The server 110 is configured to receive a location. The location may be, but is not limited to, an address, or geographic coordinates. The server 110 is communicatively connected to a plurality of data sources (Ds) 130-1 through 130-N (hereinafter referred to collectively as data sources 130 or individually as a data source 130). A data source 130 is configured to collect and provide images of maps. Such images may come from sources such as Google® maps and like sources.

In an embodiment, the system 100 may further comprise a database 140 configured to store a plurality of earth map images. The server 110 includes a processing unit 112 coupled to a memory 114. The memory 114 stores instructions that, when executed by the processing unit 112, configures the server 110 to extract an overhead image of a location from one or more data sources 130. The memory 114 further contains instructions that when executed by the processing unit 112 configures the server 110 to analyze the extracted image to identify the pattern and at least an associated surface. The memory 114 further contains instructions that when executed by the processing unit 112 configures the server 110 to analyze the extracted image to identify the outline of a surface of a structure within the extracted image.

This determination may be achieved by identifying straight lines and match combinations of straight lines that create polygons associated with surface (e.g., rooftop) outlines, and searching for a pattern associated with a surface within each surface outline. In another embodiment, the determination is enabled by statistically reviewing outline angles commonly associated with rooftops and comparing the identified straight lines to the outline angles commonly associated with rooftops.

Respective of the pattern associated with the surface, the processing unit 112 is configured to determine the surfaces upon which solar panels can be installed. The determination of the usable area within each facet of the pattern is made, for example, by identifying a textural uniformity of a surface. In one embodiment, a slant of the surface is identified by determining the transformation implied by the viewpoint and the normal to the surface. For example, a statistical assessment can be employed to determine the transformation implied by both of these. In another embodiment, the viewpoint transformation can be estimated through comparison to a database of relevant information respective of structures in a particular location, e.g., a database containing technical drawings of roads or other structures. Upon determination of the transformation and the normal, the area is re-examined to determine whether it fits for a rectangular frame, and an optimal location is determined between the identified rooftop and a rectangular frame of a solar panel. The determination of the potential of a rooftop to have solar panels placed thereon based on standard imagery which is globally available, is highly cost effective and therefore overcomes the deficiencies of the prior art.

In one embodiment, the sunshine time period of the location is determined. This determination can be made by using, for example and without limitation, an insolation map of the location, sun path maps, weather conditions maps, a digital terrain model, or a combination thereof. Upon identification of a structure within the location, the processing unit 112 executes instructions stored in the memory 114 to configure the system 100 to identify the shadow associated with an object within the location. Respective of the shadow cast by the object, the height of the object can be determined as further explained herein below with respect to FIG. 4.

In another embodiment, the shadow associated with surrounding objects at the location is identified and the height of the surrounding structures can be determined respective thereto. Thereupon, determination can be made as to the amount of shadow such objects may cast on the potential installation area of the solar panels so as to determine their effective efficiency. In yet another embodiment, the memory 114 further contains instructions that, when executed by the processing unit 112, configure the server 110 to display an overlay of the potential installation area of solar panels that is associated with the surface.

Figure 2:
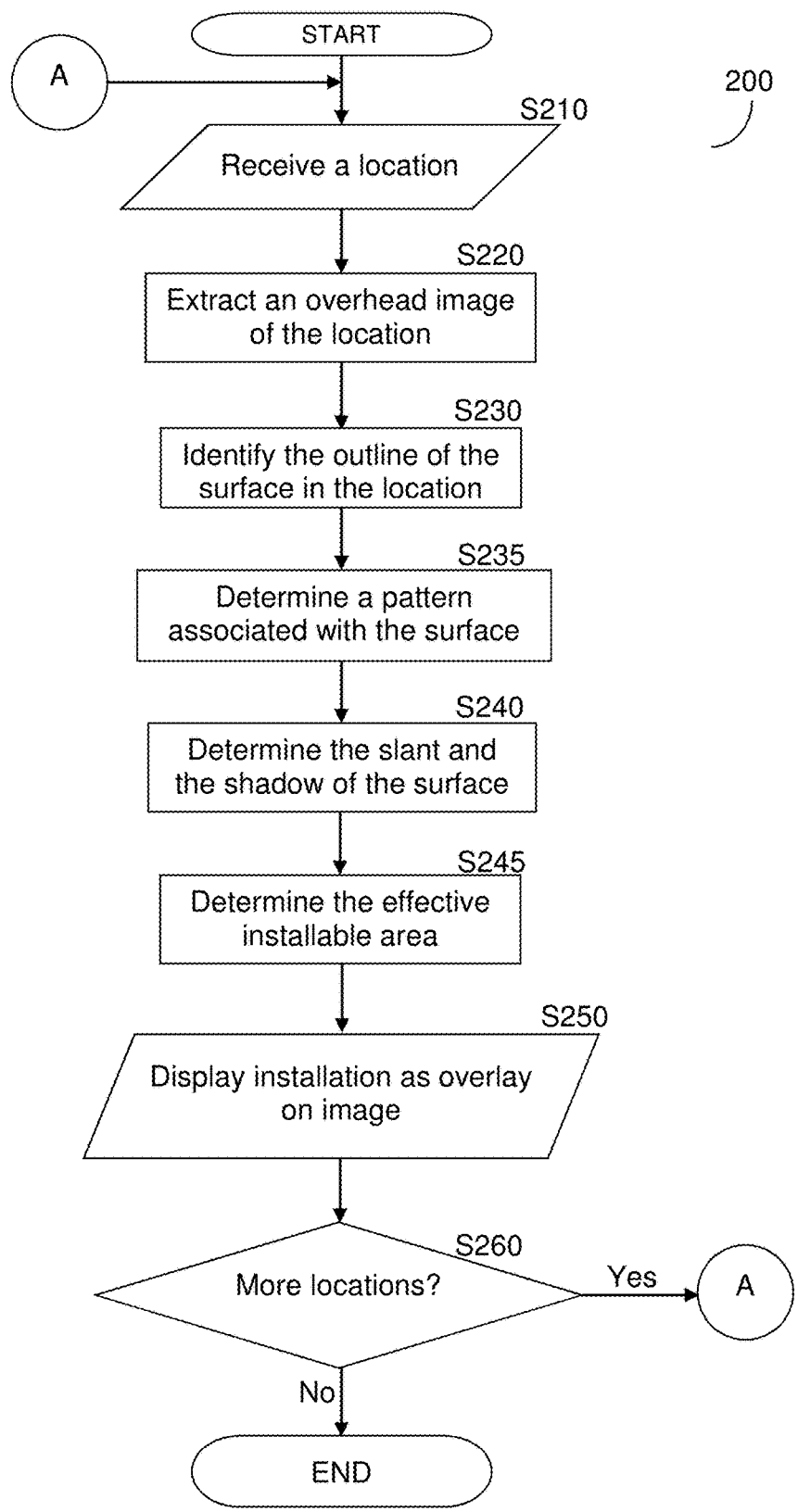
FIG. 2 is a flowchart illustrating a method for determining a potential surface for installation of solar panels according to an embodiment.

FIG. 2 depicts an exemplary and non-limiting flowchart 200 illustrating a method for determining a potential surface for installation of solar panels according to an embodiment. In S210 a location is received in order to determine the potential of installing solar panels in the location. The location may include, e.g., an address of a location, geographic coordinates, and so on. An address may include, but is not limited to, a street address (e.g., a house number on a street in a particular city, state, and/or country), geographical coordinates, and the like.

In S220, an overhead image of the location is extracted, for example from a data resource 130. By utilizing an overhead image (which is much cheaper and much more available than 3d mapping data) to automatically determine a potential surface for installation of solar panels, users can easily and efficiently receive good potential locations for placing their solar panels, and the overall potential of the surface. In S230, an outline of at least a surface in the location is identified. In S235, a pattern associated with the at least a surface that is amenable for installation of a solar panel structure is determined. The pattern includes at least a facet.

In S240, a slant of the surface is identified. In one embodiment, a shadow associated with an object that is located at or near the location is identified, and the relative height of the surrounding objects can be determined respective thereto. Based on the size of the area contained in the image, the actual height can be calculated based on the relative height. Determining relative height of an object based on its shadow is described further herein below with respect to FIG. 4.

In S245, a potential surface for installation of solar panels is determined, taking into account, for example, shade created by objects on or near the surface, position of the solar panels to be installed, and the like.

In optional S250 an overlay of the installation potential area for solar panels that is associated with the surface is displayed as an overlay over the extracted image. In S260, it is checked whether additional locations for potential positions of solar panels have been received and, if so, execution continues with S210; otherwise, execution terminates.

Figure 3A:
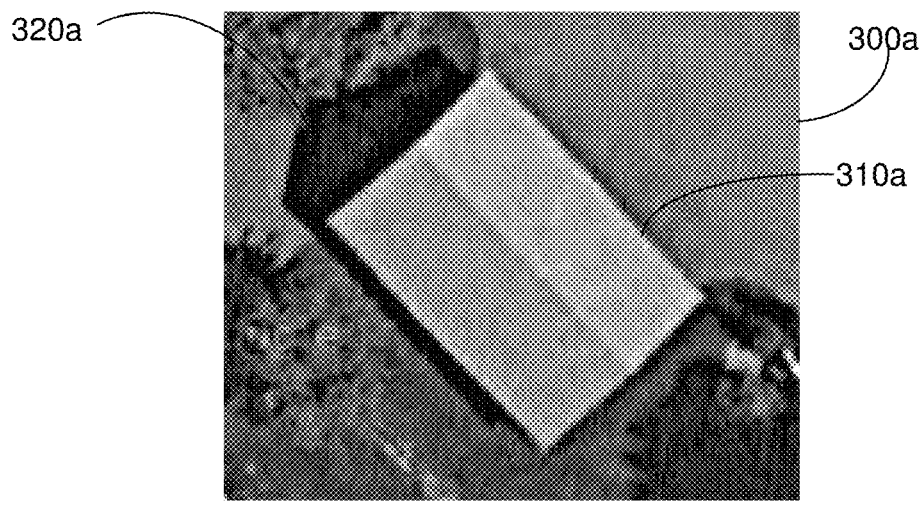
FIG. 3a is an overhead image of a structure at a first location as utilized by an embodiment.

FIG. 3a depicts an exemplary and non-limiting first overhead image 300a of a structure 310a at a first location. The overhead image 300a is used for the purpose of determination of a solar installable surface area according to an embodiment. The overhead image 300a shows a uniform structure 310a rooftop which can be used for installation of solar panels. Furthermore, a shadow of the structure 320a is also seen and may be used for further determination respective of a height of the structure 310a as further described herein below.

Figure 3B:
FIG. 3b is an overhead image of a structure at a second location as utilized by an embodiment.

FIG. 3b depicts an exemplary and non-limiting second overhead image 300b of a structure at a second location. The overhead image 300b is used to determine a solar installable surface area according to an embodiment. The overhead image 300b shows a non-uniform structure 310b rooftop. An object 320b affixed on the non-uniform structure 310b rooftop reduces the potential surface for installation of solar panels. The shadow 330a casted by the object 310b enables determination of the height of the object, which may cast shadows on other surrounding surfaces as further described herein below with respect of FIG. 4.

Figure 4:
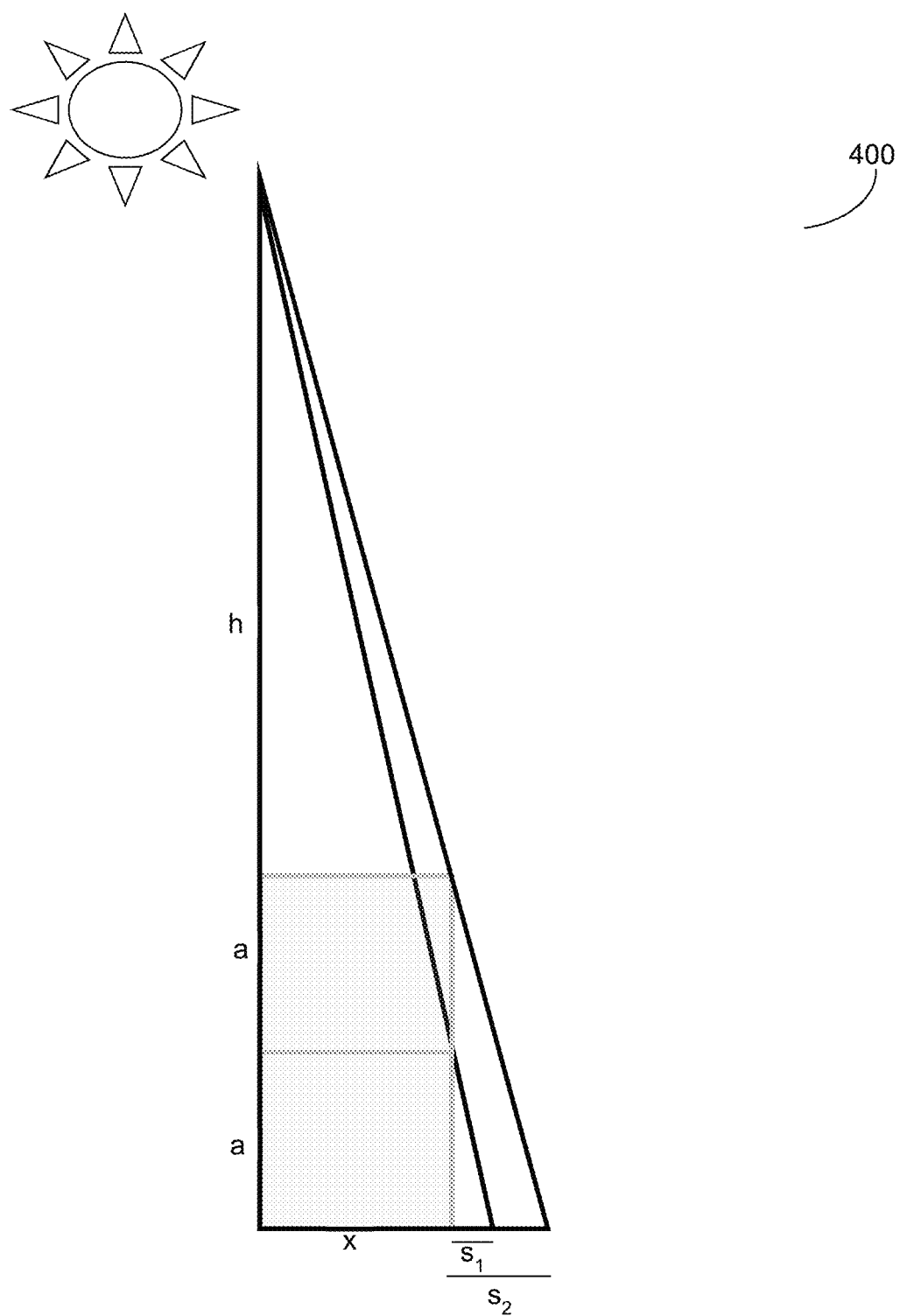
FIG. 4 is a schematic drawing for determination of a relative height of a structure based on its shadow according to an embodiment.

FIG. 4 depicts an exemplary and non-limiting drawing 400 illustrating the computation used according to an embodiment to determine a height of an object based on the size of its shadow. In the drawing 400, "x" is a positive real number that represents the ground distance of an object from the sun, where "x">0. S1 and S2 represent the shadows cast by a first structure having a first height, e.g., a height of "a," and a second structure having a second height, e.g., a height of "2a." The determination is made by the following Equation 1, where "h" represents the sun's height. For purposes of this computation, the sun's height "h" may be assumed to be infinite due to the enormous relative distance between the sun and the object. The following calculations can be therefore made:

$$\frac{x+s_1}{h} = \frac{s_1}{a}$$
$$\frac{x+s_2}{h} = \frac{s_2}{2a}$$
$$\frac{x+s_1+(s_2-s_1)}{h} = \frac{s_2}{2a}$$
$$\frac{s_1}{a} + \frac{s_2-s_1}{h} = \frac{s_2}{2a}$$
$$\frac{s_1}{a} \cong \frac{s_2}{2a}$$
$$2s_1 \cong s_2$$

Equation 1

One of ordinary skill in the art would readily appreciate that the equations above demonstrates that an object of a height "2a" casts a shadow which is twice as big as an object of a height "a." This calculation enables determination of the relative height of an object as well as neighboring objects that may cast shadows on the identified surface based on the relative sizes of the shadows cast by the objects. By understanding the shadow patterns cast by an object on the identified surface, the effectiveness of the surface for generation of electricity by solar panels may be determined. The effectiveness may be reduced according to, e.g., a portion of the surface that will typically be covered by shade during the day. In one embodiment, in order to determine the absolute height of an object, an object having a known height is identified within the image. This known height can be a previously determined height, or a height provided from records.

Figure 5A:
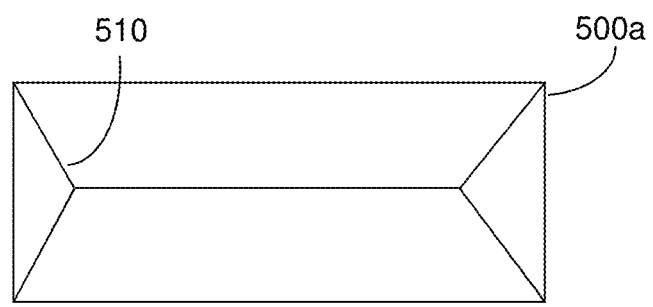
FIG. 5a is a schematic drawing for determination of a pattern of a rooftop.
Figure 5B:
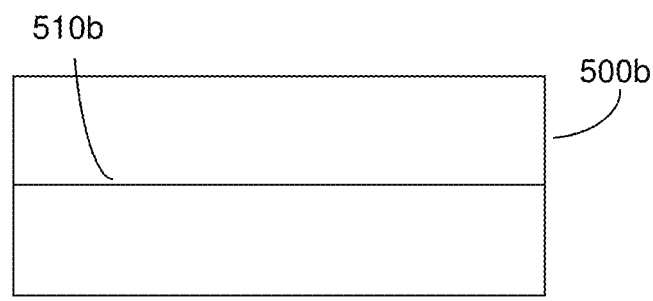
FIG. 5b is a schematic drawing for determination of a pattern of a rooftop.

FIGS. 5a and 5b depict exemplary and non-limiting schematic diagrams of top views of rooftop patterns 510a and 510b associated with uniform surfaces 500a and 500b that are utilized according to an embodiment. In one embodiment, combinations of straight lines may be identified and matched in order to determine a rooftop outline composes of rectangular shapes. Within each rectangular shape, rooftop patterns are identified. The patterns 510a and 510b are mere examples of commonly viewed rooftop shapes, and a database may contain other such shapes that may be identified as potential solar panel installation rooftops.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other embodiments of the disclosure may be achieved without departing from the scope of the disclosure. All such embodiments are included herein. The scope of the disclosure should be limited solely by the claims thereto.

What is claimed is:

1. A method for determining a potential surface for installation of solar panels, comprising:
    extracting, from a database of overhead images, at least one overhead image respective of a location;
    identifying a surface outline of at least one surface within the at least one overhead image;
    determining a pattern associated with the surface outline, the pattern comprising at least a facet;
    determining a potential installation area for solar panels based on the at least a facet, wherein the determination of the potential installation area of the solar panel is made by statistically reviewing outline angles commonly associated with rooftops and comparing the identified straight lines to the outline angles commonly associated with rooftops; and,
    displaying the potential installation area overlaid on the overhead image.

2. The method of claim 1, wherein the location is identified by at least one of a street address and geographic coordinates.

3. The method of claim 1, further comprising:
identifying at least one object at the location; and
identifying a shadow associated with the at least one object.

4. The method of claim 3, further comprising:
determining a shadow impact of the shadow on the effectiveness of the solar panels; and
correcting the expected power output of the solar panels respective of the shadow impact.

5. The method of claim 1, further comprising:
determining a slant of the at least a facet.

6. The method of claim 5, wherein determining the slant further comprising:
determining a transformation that is inferred from a viewpoint and a normal to the ground.

7. The method of claim 1, wherein the determination of the outline further comprising:
identifying at least one object affixed to the surface;
identifying a shadow associated with at least one object, wherein determining the facet is further based on the identified shadow;
determining a shadow impact of the shadow on the effectiveness of the solar panels; and
correcting the expected power output of the solar panels based on the shadow impact.

8. The method of claim 1, further comprising:
determining a sunshine time period of the location.

9. The method of claim 8, wherein the sunshine time period is determined based on information generated from any of: an insolation map, a sun path map, a digital terrain model, and a weather conditions map.

10. The method of claim 1, further comprising:
determining a textural uniformity of the surface, wherein the potential installation area is determined based on the textural uniformity of the surface.

11. A non-transitory computer readable medium having stored thereon instructions for causing one or more processing units to execute the method according to claim 1.

12. An apparatus for determining a potential surface for installation of solar panels, comprising;
a processing circuitry; and
a memory coupled to the processing circuitry, the memory containing instructions that, when executed by the processing circuitry, configure the apparatus to:
extract from a database of overhead images at least one overhead image respective of a location;
identify a surface outline of at least one surface within the at least one overhead image;
determine a pattern associated with the outline surface, the pattern comprising at least a facet;
determine a potential installation area for solar panels based on the at least a facet, wherein the determination of the potential installation area of the solar panel is made by statistically reviewing outline angles commonly associated with rooftops and comparing the identified straight lines to the outline angles commonly associated with rooftops; and
display the potential installation area overlaid on the overhead image.

13. The apparatus of claim 12, wherein the location is identified by a street address and geographic coordinates.

14. The apparatus of claim 12, wherein the apparatus is further configured to:
identify at least one object at the location; and
identify a shadow associated with the at least one object.

15. The apparatus of claim 14, wherein the apparatus is further configured to:
determine a shadow impact of the shadow on the effectiveness of the solar panels; and
correct the expected power output of the solar panels based on the shadow impact.

16. The apparatus of claim 12, wherein the apparatus is further configured to:
determine a slant of the at least a facet.

17. The apparatus of claim 16, wherein the apparatus is further configured to:
determine the transformation that is inferred from a viewpoint and a normal to the ground.

18. The apparatus of claim 12, wherein the apparatus is further configured to:
identify at least one object affixed on the surface; and
identify a shadow associated with the at least one object affixed to the surface, wherein determining the facet is further based on the identified shadow;
determine a shadow impact of the shadow on the effectiveness of the solar panels; and
correct the expected power output of the solar panels based on the shadow impact.

19. The apparatus of claim 12, wherein the apparatus is further configured to:
determine a sunshine time period of the location.

20. The apparatus of claim 19, wherein determining the sunshine time period of the location is based on information generated from at least one of: an insolation map, a sun path map, a weather conditions map, and a digital terrain model.

21. The apparatus of claim 12, wherein the apparatus is further configured to:
determine a textural uniformity of the surface, wherein the potential installation area is determined based on the textual uniformity of the surface.

* * * * *